United States Patent
Kang et al.

(10) Patent No.: US 12,388,787 B2
(45) Date of Patent: Aug. 12, 2025

(54) HARMFUL URL DETECTION METHOD

(71) Applicant: PILLSANG CO., LTD., Daejeon (KR)

(72) Inventors: Pill Sang Kang, Daejeon (KR); Ji Hun Kim, Daejeon (KR); Ki Heon Hong, Daejeon (KR)

(73) Assignee: PILLSANG CO., LTD., Daejeon (KR)

( * ) Notice: Subject to any disclaimer, the term of this patent is extended or adjusted under 35 U.S.C. 154(b) by 181 days.

(21) Appl. No.: 18/370,405

(22) Filed: Sep. 20, 2023

(65) Prior Publication Data
US 2024/0048589 A1 Feb. 8, 2024

Related U.S. Application Data

(63) Continuation of application No. PCT/KR2022/014207, filed on Sep. 22, 2022.

(30) Foreign Application Priority Data

Jul. 22, 2022 (KR) ........................ 10-2022-0090995

(51) Int. Cl.
*H04L 9/40* (2022.01)
*G06F 11/34* (2006.01)
*H04L 41/16* (2022.01)

(52) U.S. Cl.
CPC ...... *H04L 63/0236* (2013.01); *G06F 11/3438* (2013.01); *H04L 41/16* (2013.01);
(Continued)

(58) Field of Classification Search
CPC . H04L 63/0236; H04L 63/20; H04L 63/1416; H04L 67/02; H04L 63/1483;
(Continued)

(56) References Cited

U.S. PATENT DOCUMENTS

| | | | | |
|---|---|---|---|---|
| 9,043,894 B1 * | 5/2015 | Dennison | ............ | H04L 63/1408 726/11 |
| 11,706,222 B1 * | 7/2023 | Qiu | ....................... | H04L 63/168 726/22 |

(Continued)

FOREIGN PATENT DOCUMENTS

| | | |
|---|---|---|
| CN | 108092962 | 5/2018 |
| KR | 10-0460015 | 12/2004 |

(Continued)

*Primary Examiner* — Kyung H Shin
(74) *Attorney, Agent, or Firm* — PnK IP LLC

(57) ABSTRACT

A harmful URL detection method is proposed. The method includes requesting entry to a web page to which access is sought from a user terminal, comparing an access target URL corresponding to the entry-requested web page with a pre-stored whitelist, excluding the access target URL from a detection target when an identical domain exists as a result of the comparison with the whitelist, checking whether the access target URL refers to a previously accessed web page when the identical domain does not exist, excluding the access target URL from the detection target in a case of the previously accessed web page, checking a response code for the access target URL in a case of a web page not previously accessed, and excluding the access target URL from the detection target when the access target URL is abnormal in communication according to the checking of the response code.

9 Claims, 9 Drawing Sheets

(52) U.S. Cl.
CPC ...... *H04L 63/1408* (2013.01); *H04L 63/1483* (2013.01); *H04L 63/168* (2013.01)

(58) Field of Classification Search
CPC .............. H04L 63/1408; H04L 63/145; H04L 63/168; H04L 63/0209; H04L 63/101; G06F 11/3438; G06F 21/44; G06F 21/6263; G06F 21/566; G06F 16/9535; G06F 21/552; G06N 20/00
See application file for complete search history.

(56) References Cited

U.S. PATENT DOCUMENTS

| | | | |
|---|---|---|---|
| 2021/0105302 A1* | 4/2021 | Prakash | .............. G06F 11/3438 |
| 2022/0038424 A1* | 2/2022 | Liu | ..................... H04L 63/0236 |

FOREIGN PATENT DOCUMENTS

| | | |
|---|---|---|
| KR | 10-2011-0129020 | 12/2011 |
| KR | 10-2012-0121668 | 11/2012 |
| KR | 10-1545964 | 8/2015 |
| KR | 10-2018-0051806 | 5/2018 |

* cited by examiner

FIG. 3
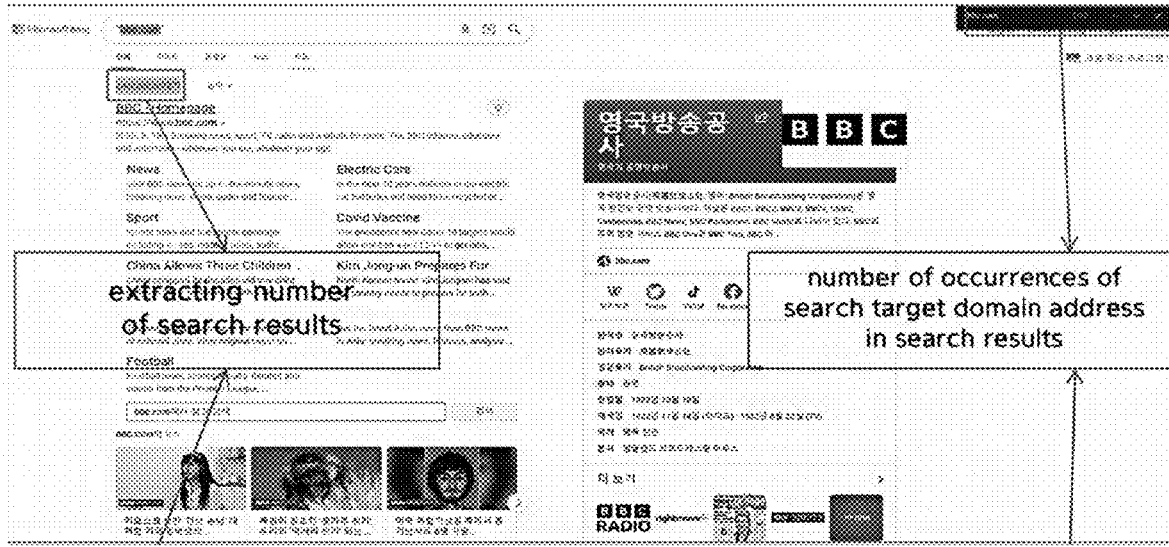
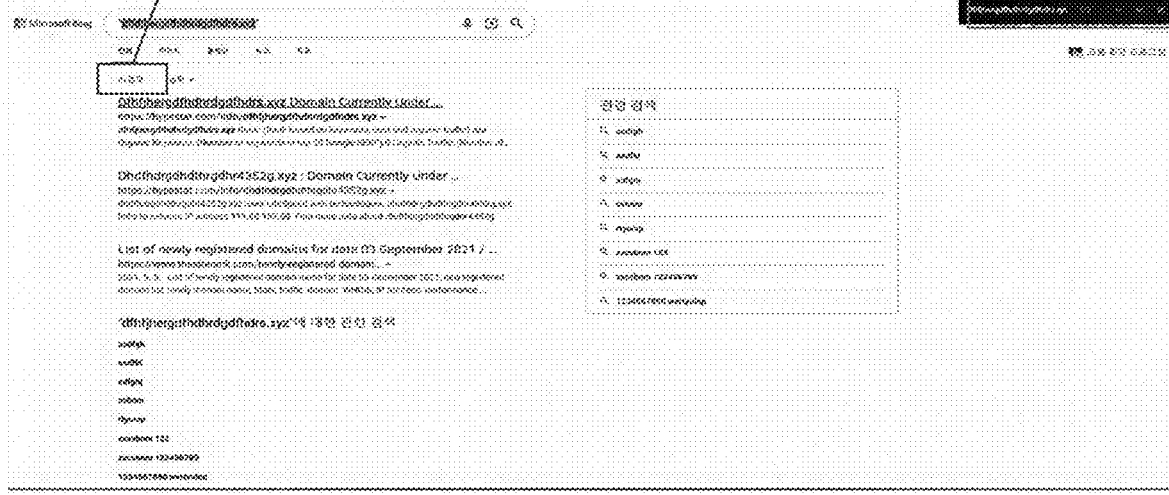

FIG. 5

```html
<body>
    <h1>Index of /</h1>
    <table>
        <tr>
            <th valign="top"> </th>
            <th><a href="?C=N;O=D">Name</a></th>
            <th><a href="?C=M;O=A">Last modified</a></th>
            <th><a href="?C=S;O=A">Size</a></th>
            <th><a href="?C=D;O=A">Description</a></th>
        </tr>
        <tr>
            <th colspan="5">
                <hr />
            </th>
```

FIG. 7 gutterarizona.com - ◆ Suspicious Hostname - Maltiverse
https://maltiverse.com/hostname/gutterarizona.com ▾
gutterarizona.com. Classification: suspicious. Tags. phishing Blacklist sightings. Description
Source First Seen Last Seen Labels; Phishing: OpenPhish 2022-05-27 00:41:39 2022-05-27...

https://gutterarizona.com/invoice/ - ● Malicious Url - Maltiverse
https://maltiverse.com/url/47d0e01b870597bf37222ccbed704... ▾
2022. 5. 27. · Modification time: 2022-05-27 11:40:11 DNS creation time: DNS last updated:

2a06:98c1:3120::a - urlscan.io
https://urlscan.io/ip/2a06:98c1:3120::a ▾
2022. 5. 5. · WHOIS for 2a06:98c1:3120::a inet6num: 2a06:98c1::/32 netname: CLOUDFLARENET-
EU country: GB admin-c: CAC80-RIPE tech-c: CTC6-RIPE status: ASSIGNED mnt-by: MNT-...

HARMFUL URL DETECTION METHOD

CROSS REFERENCE TO RELATED APPLICATION

This application is a Bypass Continuation of International Application No. PCT/KR2022/014207, filed on Sep. 22, 2022, and claims priority from and the benefit of Korean Patent Application No. 10-2022-0090995, filed on Jul. 22, 2022, each of which is incorporated by reference for all purposes as if fully set forth herein.

BACKGROUND

Field

The present disclosure relates to a harmful URL detection method, wherein in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, not only the access target URL is excluded from the detection target but also a harmful URL is detected through an artificial intelligence model using various data that may occur on the web, whereby harmful URLs may be effectively detected and blocked.

Discussion of the Background

As is well known, due to the recent development of communication networks and the popularization of mobile devices such as personal computers (PCs), portable terminals, smartphones, and PDAs, various kinds of content such as video data, audio data, and photo data may be downloaded or used in real time without restrictions on time and place.

In addition, increasingly, users access various websites by using computers, portable devices, and the like to obtain or utilize information without the restrictions of time and place.

However, along with the convenience increase of cultural life due to the free use of the Internet, a risk that children and adolescents are exposed to harmful content such as obscene videos and fraudulent content is also increasing.

Accordingly, the demand for technology for analyzing the details of content that may be easily accessible on the Internet so as to automatically determine whether the content is harmful or not and block access in case of harmful content is continuously increasing.

Meanwhile, conventionally, the technology for blocking harmful content has been performed in various ways according to the type of target content. This technology may be performed in a method, wherein in a case where videos, still images, etc. are stored and executed in a terminal, data stored in the terminal is analyzed for harmfulness and then the harmful content is deleted and blocked, or in a case where content such as streaming services on the Internet is provided in real time without the process of being stored in the terminal, the harmfulness is determined and blocked at a time of playing each video.

Meanwhile, as the convenience in use of the Internet environment is enhanced and the speed of available communication increase, a method of blocking access to URLs by using a whitelist containing large-scale normal URL information and a blacklist containing large-scale harmful URL information is mainly used nowadays because the percentage of users using the content after accessing corresponding websites through web addresses (i.e., URLs: Uniform Resource Locators) on the Internet is increasing, rather than directly storing and using the content in terminals.

However, since URLs may be counterfeited and modified in an infinite number of ways, and the rate of counterfeiting is very fast, there is a limit to lie-scale list-based detection, so the development of a technique to detect and block harmful URLs more efficiently is required.

The above information disclosed in this Background section is only for understanding of the background of the inventive concepts, and, therefore, it may contain information that does not constitute prior art.

SUMMARY

An objective of the present disclosure is to provide a harmful URL detection method, wherein in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

In addition, another objective of the present disclosure is to provide a harmful URL detection method, wherein in a case where an access target URL is normal in communication according a response code, an access target domain is extracted from the access target URL, detailed searches are performed on at least one portal, features of the number of searches are extracted from search result pages, the extracted features of the number of searches are clustered by using an artificial intelligence model, and then a threshold value between normal and malicious values, from which anomalies are removed, is extracted from among clustering results, so that the access target URL is classified as malicious when the extracted threshold value is relatively lower than a preset reference feature value, whereby a harmful URL may be more effectively detected and blocked.

In addition, a yet another objective of the present disclosure is to provide a harmful URL detection method, wherein in a case where an access target URL is normal in communication according to a response code, HTML syntax of the access target URL is extracted, learning target features for artificial intelligence learning are extracted from the extracted HTML syntax, artificial intelligence learning is performed by creating artificial intelligence learning data including the extracted learning target features, and then, whether the access target URL is normal or malicious is checked by using an artificial intelligence model, whereby a harmful URL may be even more effectively detected and blocked.

In addition, a still another objective of the present disclosure is to provide a harmful URL detection method, wherein in a case where an access target URL is normal in communication according to a response code, website searches are performed for the access target URL to extract details of search results thereof, the extracted details of the search results are tokenized into character strings, a sentiment lexicon is generated by assigning a sentiment score to each tokenized character string, and then by using the sentiment lexicon, whether the access target URL is normal or malicious is checked through learning and analysis using an artificial intelligence model, whereby a harmful URL may be even more effectively detected and blocked.

The objectives of exemplary embodiments of the present disclosure are not limited to the above-mentioned objectives, and other different objectives not mentioned herein will be clearly understood by those skilled in the art from the following description.

Additional features of the inventive concepts will be set forth in the description which follows, and in part will be apparent from the description, or may be learned by practice of the inventive concepts.

According to one aspect of the invention, a harmful URL detection method includes: requesting entry to a web page to which access is sought from a user terminal; comparing an access target uniform resource locator (URL) corresponding to the entry-requested web page with a pre-stored whitelist; excluding the access target URL from a detection target in a case where an identical domain exists as a result of the comparison with the whitelist; checking whether the access target URL refers to a previously accessed web page in a case where the identical domain does not exist; excluding the access target URL from the detection target in a case of the previously accessed web page; checking a response code for the access target URL in a case of a web page not previously accessed; and excluding the access target URL from the detection target in a case where the access target URL is not normal in communication according to the checking of the response code.

The harmful URL detection method may further include: extracting an access target domain from the access target URL and performing detailed searches on at least one portal in a case where the access target URL is normal in communication according to the checking of the response code; extracting features of the number of searches from search result pages obtained by performing the detailed searches; clustering the extracted features of the number of searches by using an artificial intelligence model; extracting a threshold value between normal and malicious values, from which anomalies are removed, from among clustering results obtained through the clustering step; and classifying the access target URL as malicious in a case where the extracted threshold value is relatively lower than a preset reference feature value.

The harmful URL detection method may further include adding the access target URL to the whitelist by classifying the access target URL as normal in a case where the extracted threshold value is relatively higher than the preset reference feature value.

The harmful URL detection method may further include: extracting Hypertext Markup Language (HTML) syntax of the access target URL in a case where the access target URL is normal in communication according to the checking of the response code; extracting learning target features for artificial intelligence learning from the extracted HTML syntax; performing the artificial intelligence learning by creating artificial intelligence learning data comprising the extracted learning target features; and checking whether the access target URL is normal or malicious by using the artificial intelligence model that has performed the artificial intelligence learning.

The harmful URL detection method may further include adding the access target URL to the whitelist in the case where the access target URL is normal.

The harmful URL detection method may further include: performing a website search for the access target URL in a case where the access target URL is normal in communication according to the checking of the response code; extracting details of search results for the website search; tokenizing the extracted details of the search results into character strings; generating a sentiment lexicon by assigning a sentiment score for each tokenized character string; and checking whether the access target URL is normal or malicious through learning and analysis using the artificial intelligence model by using the sentiment lexicon.

The harmful URL detection method may further include adding the access target URL to the whitelist in the case where the access target URL is normal.

According to another aspect of the invention, a harmful URL detection method includes: requesting entry to a web page to which access is sought from a user terminal; comparing an access target uniform resource locator (URL) corresponding to the entry-requested web page with a pre-stored whitelist; excluding the access target URL from a detection target in a case where an identical domain exists as a result of the comparison with the whitelist; checking whether the access target URL refers to a previously accessed web page in a case where the identical domain does not exist; excluding the access target URL from the detection target in a case of the previously accessed web page; checking a response code for the access target URL in a case of a web page not previously accessed; excluding the access target URL from the detection target in a case where the access target URL is not normal in communication according to the checking of the response code; step 1-1 of performing, in a case where the access target URL is normal in communication according to the checking of the response code, detailed searches on at least one portal for the access target URL, performing clustering by using an artificial intelligence model after extracting features of the number of searches, and classifying the access target URL as normal or malicious by extracting a threshold value between normal and malicious values from which anomalies are removed; step 1-2 of extracting, in the case where the access target URL is normal in communication according to the checking of the response code, Hypertext Markup Language (HTML) syntax of the access target URL, extracting learning target features for artificial intelligence learning, creating artificial intelligence learning data, performing the artificial intelligence learning, and then checking whether the access target URL is normal or malicious; step 1-3 of performing, in the case where the access target URL is normal in communication according to the checking of the response code, a website search for the access target URL, assigning sentiment scores after extracting and tokenizing details, generating a sentiment lexicon, and checking whether the access target URL is normal or malicious through learning and analysis using the artificial intelligence model; step 2 of processing model weight ensemble on each result of step 1-2 and step 1-3; and performing final classification of a result of step 2 by using a result of step 1-1.

The present disclosure has an effect that in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

In addition, the present disclosure has another effect that in a case where an access target URL is normal in communication according a response code, an access target domain is extracted from the access target URL, detailed searches are performed on at least one portal, features of the number of searches are extracted from search result pages, the extracted features of the number of searches are clustered by using an artificial intelligence model, and then a threshold value between normal and malicious values, from which anomalies are removed, is extracted from among clustering results, so that the access target URL is classified as malicious when the extracted threshold value is relatively lower than a preset reference feature value, whereby a harmful URL may be more effectively detected and blocked.

In addition, the present disclosure has a yet another effect that in a case where an access target URL is normal in communication according to a response code, HTML syntax of the access target URL is extracted, learning target features for artificial intelligence learning are extracted from the extracted HTML syntax, artificial intelligence learning is performed by creating artificial intelligence learning data including the extracted learning target features, and then, whether the access target URL is normal or malicious is checked by using an artificial intelligence model, whereby a harmful URL may be even more effectively detected and blocked.

In addition, the present disclosure has a still another effect that in a case where an access target URL is normal in communication according to a response code, website searches are performed for the access target URL to extract details of search results thereof the extracted details of the search results are tokenized into character strings, a sentiment lexicon is generated by assigning a sentiment score to each tokenized character string, and then by using the sentiment lexicon, whether the access target URL is normal or malicious is checked through learning and analysis using an artificial intelligence model, whereby a harmful URL may be even more effectively detected and blocked.

It is to be understood that both the foregoing general description and the following detailed description are illustrative and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate illustrative embodiments of the invention, and together with the description serve to explain the inventive concepts.

FIG. 3 is a view for describing the process of detecting the harmful URL according to the second exemplary embodiment of the present disclosure.

FIG. 5 is a view for describing the process of detecting the harmful URL according to the third exemplary embodiment of the present disclosure.

FIGS. 7 and 8 are views for describing the process of detecting the harmful URL according to the fourth exemplary embodiment of the present disclosure.

DETAILED DESCRIPTION

Figure 1:
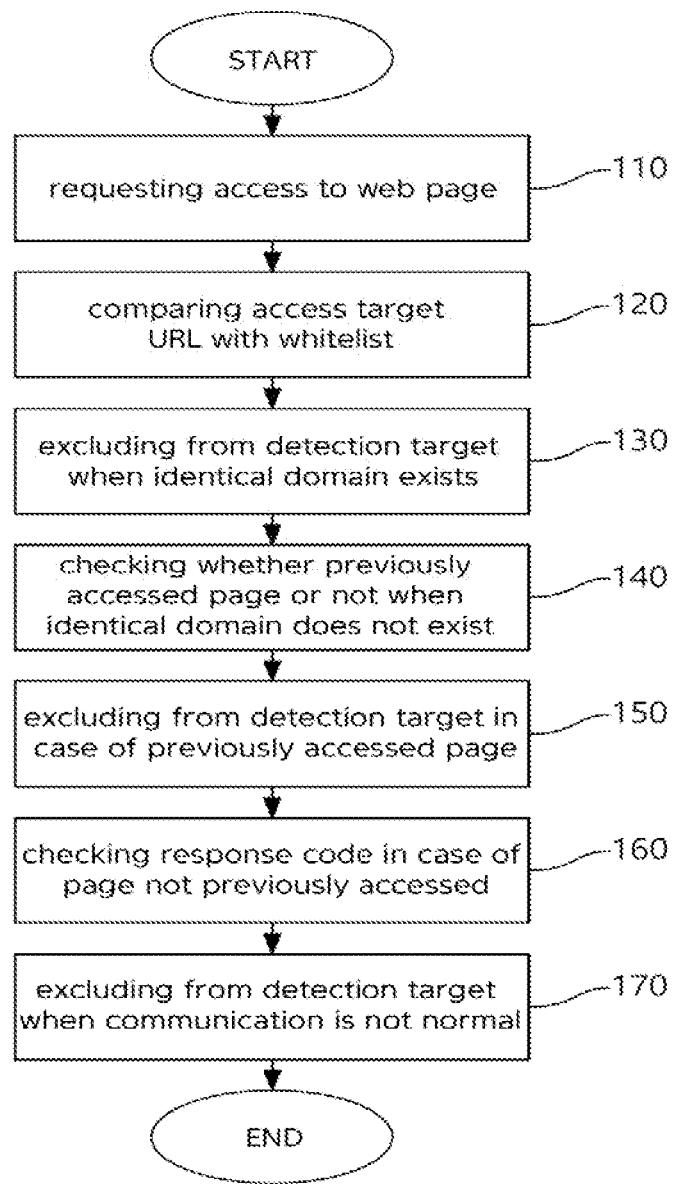
FIG. 1 is a flowchart illustrating a process of detecting a harmful URL according to a first exemplary embodiment of the present disclosure.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods employing one or more of the inventive concepts disclosed herein. It is apparent, however, that various embodiments may be practiced without these specific details or with one or more equivalent arrangements. In other instances, well-known structures and devices are shown in block diagram form in order to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing illustrative features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Advantages and features of the exemplary embodiments of the present disclosure and the methods of achieving the same will become apparent with reference to exemplary embodiments described below in detail in conjunction with the accompanying drawings. However, the present disclosure is not limited to the exemplary embodiments disclosed below, but will be implemented in a variety of different forms. These exemplary embodiments are provided only to complete the present disclosure and to completely inform the scope of the present disclosure to those skilled in the art to which the present disclosure pertains, and the present disclosure is only defined by the scope of the claims. Like reference numerals generally denote like elements throughout the present disclosure.

In the following descriptions of the exemplary embodiments of the present disclosure, it should be noted that, when a detailed description of a known function or configuration may unnecessarily obscure the subject matter of the present disclosure, the detailed description thereof will be omitted. In addition, terms to be described later are terms defined in consideration of functions in the exemplary embodiments of the present disclosure, which may vary according to the intention, custom, etc. of users or operators. Therefore, definitions of these terms should be made on the basis of the content throughout the present specification.

Hereinafter, exemplary embodiments of the present disclosure will be described in detail with reference to the accompanying drawings.

FIG. 1 is a flowchart illustrating a process of detecting a harmful URL according to a first exemplary embodiment of the present disclosure.

Here, the harmful URL detection method may be performed through a processor for executing step-by-step programs for detecting harmful URLs while searching and accessing web pages, a storage medium for storing various setting information, a whitelist, and the like, and a user terminal of which the processor is executed (e.g., a computer terminal, a mobile terminal, etc.).

Referring to FIG. 1, in step 110, in a user terminal, entry may be requested to a web page to which access is sought. Here, in the user terminal, in a case where the web page is entered after a website is searched, a corresponding entry request may be generated, and accordingly, a harmful URL detection step described below may be performed.

In addition, in step 120, in the user terminal, an access target uniform resource locator (URL) corresponding to the web page requested for the entry may be compared with a pre-stored whitelist.

For example, in the user terminal, a domain area excluding parameters from the entire URL for the access target URL requested for the entry may be extracted, and the extracted domain area may be compared with the pre-stored whitelist in the form of a dictionary.

In step 130, in the user terminal, in a case where an identical domain exists as a result of the comparison in step 120, the access target URL may be excluded from a detection target.

Here, in the user terminal, in a case where a domain same as a domain area of the access target URL exists in the pre-stored whitelist, the access target URL may be determined as a normal URL and be excluded from the detection target (i.e., the harmful URL).

Meanwhile, in step 140, in the user terminal, in a case where the identical domain does not exist as the result of the comparison in step 120, whether the access target URL refers to a previously accessed web page or not may be checked.

In step 140 of checking whether the access target URL refers to the previously accessed web page or not, step 140 may be performed in such a way that in the user terminal, referrers of the access target URL and previously accessed web page are compared with each other to check whether the referrers are the same or not.

For example, in the user terminal, in a case where the domain same as the domain area of the access target URL does not exist in the pre-stored whitelist, whether the web page has been previously accessed or not may be checked in a way of comparing the referrer of the access target URL and the referrer of the previously accessed web page with each other.

Here, a referrer is an HTTP protocol header value, and through this referrer, which webpage the currently displayed webpage was requested from may be checked, and which website or webserver a visitor came from may be determined.

In step 150, in the user terminal, in a case of the previously accessed web page as a result of the checking in step 140, the access target URL may be excluded from the detection target.

Here, in the user terminal, in a case of the previously accessed web page due to the same referrer of the access target URL and that of the previously accessed webpage, the access target URL is determined as a normal URL, and may be excluded from the detection target (i.e., the harmful URL). The reason is that there is no need to perform a process described below because the harmful URL detection target has been checked and classified in the case of the previously accessed web page.

Meanwhile, in step 160, in the user terminal, in a case of a web page not previously accessed as a result of the checking in step 140, a response code for the access target URL may be checked.

Here, a response code is a list of HTTP response status codes, and may represent that 1 is conditional response, 2 is success, 3 is redirection completion, 4 is request error, and 5** is server error.

Next, in step 170, in the user terminal, in a case where the access target URL is not normal in communication according to the checking of the response code in step 160, the access target URL may be excluded from the detection target.

Here, in a case where the response code is the redirection code of 3, a final code may be checked by continuously trying requests until the limit of corresponding scope is exceeded. In a case of the response code of 4 or 5**, indicating that the access target URL is not normal in communication, the access target URL may be determined as an inaccessible website and excluded from the detection target.

Therefore, according to a first exemplary embodiment of the present disclosure, in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

Figure 2:
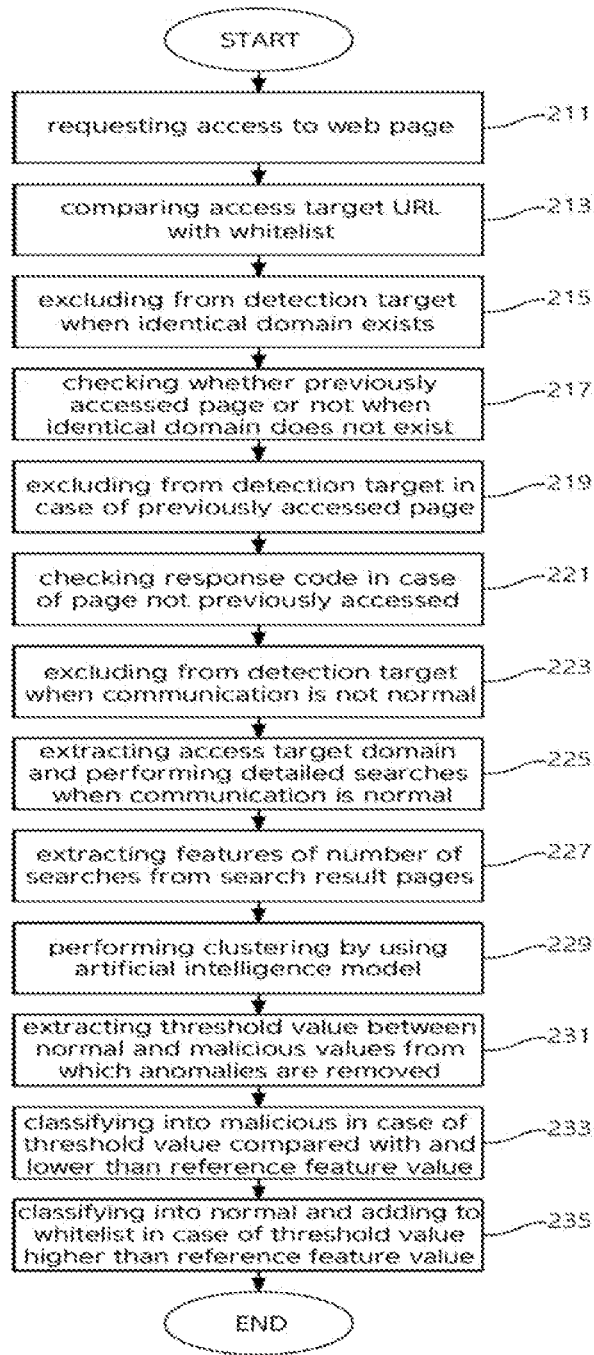
FIG. 2 is a flowchart illustrating a process of detecting a harmful URL according to a second exemplary embodiment of the present disclosure.

FIG. 2 is a flowchart illustrating a process of detecting a harmful URL according to a second exemplary embodiment of the present disclosure, and FIG. 3 is a view for describing the process of detecting the harmful URL according to the second exemplary embodiment of the present disclosure.

Here, the harmful URL detection method may be performed through a processor for executing step-by-step programs for detecting harmful URLs while searching and accessing web pages, a storage medium for storing various setting information, a whitelist, an artificial intelligence model, a statistical anomaly calculation algorithm, a reference value, and the like, and a user terminal of which the processor is executed (e.g., a computer terminal, a mobile terminal, etc.).

Referring to FIGS. 2 and 3, in step 211, in a user terminal, entry may be requested to a web page to which access is sought. Here, in the user terminal, in a case where the web page is entered after a website is searched, a corresponding entry request may be generated, and accordingly, a harmful URL detection step described below may be performed.

In addition, in step 213, in the user terminal, an access target uniform resource locator (URL) corresponding to the web page requested for the entry may be compared with a pre-stored whitelist.

For example, in the user terminal, a domain area excluding parameters from the entire URL for the access target URL requested for the entry may be extracted, and the extracted domain area may be compared with the pre-stored whitelist in the form of a dictionary.

In step 215, in the user terminal, in a case where an identical domain exists as a result of the comparison in step 213, the access target URL may be excluded from a detection target.

Here, in the user terminal, in a case where a domain same as a domain area of the access target URL exists in the pre-stored whitelist, the access target URL may be determined as a normal URL and be excluded from the detection target (i.e., the harmful URL).

Meanwhile, in step 217, in the user terminal, in a case where the identical domain does not exist as the result of the comparison in step 213, whether the access target URL refers to a previously accessed web page or not may be checked.

In step 140 of checking whether the access target URL refers to the previously accessed web page or not, step 140 may be performed in such a way that in the user terminal, referrers of the access target URL and previously accessed web page are compared with each other to check whether the referrers are the same or not.

For example, in the user terminal, in a case where the domain same as the domain area of the access target URL does not exist in the pre-stored whitelist, whether the web page has been previously accessed or not may be checked in a way of comparing the referrer of the access target URL and the referrer of the previously accessed web page with each other.

Here, a referrer is an HTTP protocol header value, and through this referrer, which webpage the currently displayed webpage was requested from may be checked, and which website or webserver a visitor came from may be determined.

In step 219, in the user terminal, in a case of the previously accessed web page as a result of the checking in step 217, the access target URL may be excluded from the detection target.

Here, in the user terminal, in a case of the previously accessed web page due to the same referrer of the access target URL and that of the previously accessed webpage, the access target URL is determined as a normal URL, and may be excluded from the detection target (i.e., the harmful URL). The reason is that there is no need to perform a process described below because the harmful URL detection target has been checked and classified in the case of the previously accessed web page.

Meanwhile, in step 221, in the user terminal, in a case of a web page not previously accessed as a result of the checking in step 217, a response code for the access target URL may be checked.

Here, a response code is a list of HTTP response status codes, and may represent that 1 is conditional response, 2 is success, 3 is redirection completion, 4 is request error, and 5** is server error.

Next, in step 223, in the user terminal, in a case where the access target URL is not normal in communication according to the checking of the response code in step 221, the access target URL may be excluded from the detection target.

Here, in a case where the response code is the redirection code of 3, a final code may be checked by continuously trying requests until the limit of corresponding scope is exceeded. In a case of the response code of 4 or 5**, indicating that the access target URL is not normal in communication, the access target URL may be determined as an inaccessible website and excluded from the detection target.

Meanwhile, in step 225, in the user terminal, in the case where the access target URL is normal in communication according to the checking of the response code in step 221, detailed searches on at least one portal may be performed by extracting an access target domain from the access target URL.

Here, in a case where the access target URL has response codes of 1, 2, and some 3, indicating normal communication, the harmful URL detection process may be performed thereafter. Accordingly, in the user terminal, a domain area excluding parameters from the entire URL in the access target URL may be extracted and a detailed search using a detailed search query for each portal may be performed. For example, "~" and the like may be used for Google detailed searches, and "inanchor: **" and the like may be used for Bing detailed searches.

Next, in step 227, in the user terminal, features of the number of searches may be extracted from search result pages obtained by performing the detailed searches in step 225.

For example, in the user terminal, as shown in FIG. 3, the features of the number of searches, including the number of search results, the number of domain occurrences in the search results, the number of designated malicious keyword searches, etc. may be extracted from the search result pages.

In addition, in step 229, in the user terminal, clustering the extracted features of the number of searches may be performed by using an artificial intelligence model.

For example, in the user terminal, clustering the features of the number of searches may be performed by using a K-means clustering algorithm, which is an unsupervised artificial intelligence model, for the extracted features of the number of searches (e.g., the number of search results, the number of domain occurrences in the search results, the number of searches for designated malicious keywords, etc.). Clustering according to distances of coordinates may be performed by expressing positions of feature data, which has a plurality of feature values corresponding to the number of domain occurrences in the search results, the number of searches for the designated malicious keywords, etc., as x values and y values on a plane by using the K-means algorithm.

Here, the K-means algorithm indicates an algorithm that groups pieces of data having similar features into K clusters.

Next, in step 231, in the user terminal, a threshold value between normal and malicious values, from which anomalies are removed, may be extracted from among the clustering results obtained through the clustering step 229.

For example, in the user terminal, a statistical anomaly calculation method including a modified Z-score and the like is used to find and remove anomalies from among the clustering results, and according to the anomalies, a threshold value between normal and malicious values may be extracted.

In addition, in step 233, in the user terminal, in a case where the extracted threshold value is relatively lower than a preset reference feature value, the access target URL may be classified as malicious.

In addition, in step 235, in the user terminal, in a case where the extracted threshold value is relatively higher than the preset reference feature value, the access target URL may be classified as normal and added to the whitelist.

Therefore, according to a second the exemplary embodiment of the present disclosure, in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

In addition, according to the second exemplary embodiment of the present disclosure, in a case where an access target URL is normal in communication according a response code, an access target domain is extracted from the access target URL, detailed searches are performed on at least one portal, features of the number of searches are extracted from search result pages, the extracted features of the number of searches are clustered by using an artificial intelligence model, and then a threshold value between normal and malicious values, from which anomalies are removed, is extracted from among clustering results, so that the access target URL is classified as malicious when the extracted threshold value is relatively lower than a preset reference feature value, whereby a harmful URL may be more effectively detected and blocked.

Figure 4:
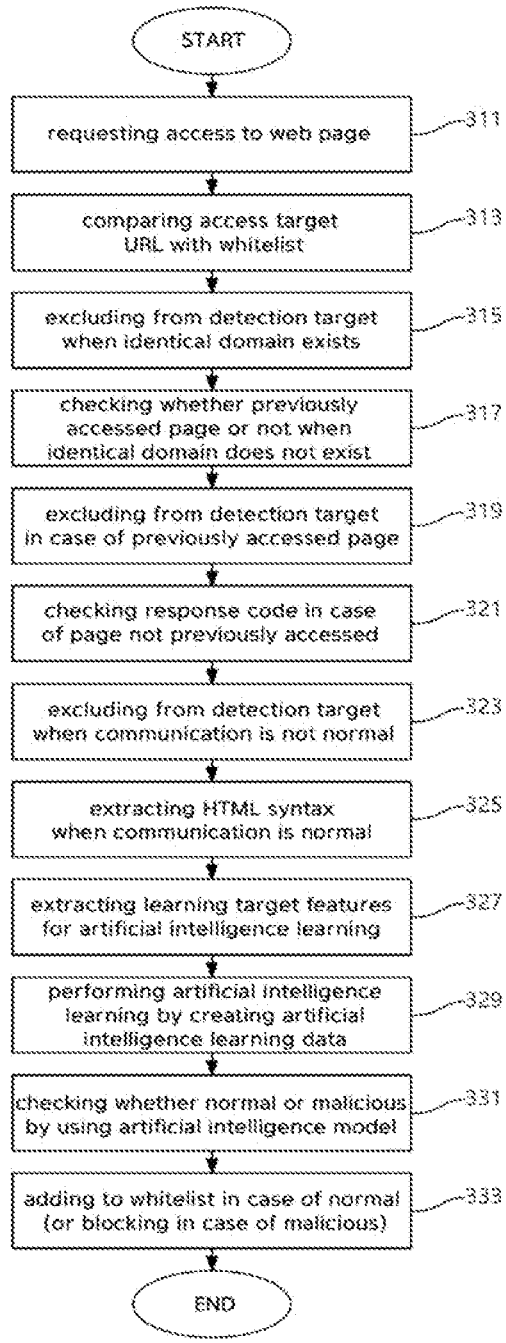
FIG. 4 is a flowchart illustrating a process of detecting a harmful URL according to a third exemplary embodiment of the present disclosure.

FIG. 4 is a flowchart illustrating a process of detecting a harmful URL according to a third exemplary embodiment of the present disclosure, and FIG. 5 is a view for describing the process of detecting the harmful URL according to the third exemplary embodiment of the present disclosure.

Here, the harmful URL detection method may be performed through a processor for executing step-by-step programs for detecting harmful URLs while searching and accessing web pages, a storage medium for storing various setting information, a whitelist, a correlation analysis algorithm, an artificial intelligence model, and the like, and a user terminal of which the processor is executed (e.g., a computer terminal, a mobile terminal, etc.).

Referring to FIGS. 4 and 5, in step 311, in a user terminal, entry may be requested to a web page to which access is sought. Here, in the user terminal, in a case where the web page is entered after a website is searched, a corresponding entry request may be generated, and accordingly, a harmful URL detection step described below may be performed.

In addition, in step 313, in the user terminal, an access target uniform resource locator (URL) corresponding to the web page requested for the entry may be compared with a pre-stored whitelist.

For example, in the user terminal, a domain area excluding parameters from the entire URL for the access target URL requested for the entry may be extracted, and the extracted domain area may be compared with the pre-stored whitelist in the form of a dictionary.

In step 315, in the user terminal, in a case where an identical domain exists as a result of the comparison in step 313, the access target URL may be excluded from a detection target.

Here, in the user terminal, in a case where a domain same as a domain area of the access target URL exists in the pre-stored whitelist, the access target URL may be determined as a normal URL and be excluded from the detection target (i.e., the harmful URL).

Meanwhile, in step 317, in the user terminal, in a case where the identical domain does not exist as the result of the comparison in step 313, whether the access target URL refers to a previously accessed web page or not may be checked.

In step 140 of checking whether the access target URL refers to the previously accessed web page or not, step 140 may be performed in such a way that in the user terminal, referrers of the access target URL and previously accessed web page are compared with each other to check whether the referrers are the same or not.

For example, in the user terminal, in a case where the domain same as the domain area of the access target URL does not exist in the pre-stored whitelist, whether the web page has been previously accessed or not may be checked in a way of comparing the referrer of the access target URL and the referrer of the previously accessed web page with each other.

Here, a referrer is an HTTP protocol header value, and through this referrer, which webpage the currently displayed webpage was requested from may be checked, and which website or webserver a visitor came from may be determined.

In step 319, in the user terminal, in a case of the previously accessed web page as a result of the checking in step 317, the access target URL may be excluded from the detection target.

Here, in the user terminal, in a case of the previously accessed web page due to the same referrer of the access target URL and that of the previously accessed webpage, the access target URL is determined as a normal URL, and may be excluded from the detection target (i.e., the harmful URL). The reason is that there is no need to perform a process described below because the harmful URL detection target has been checked and classified in the case of the previously accessed web page.

Meanwhile, in step 321, in the user terminal, in a case of a web page not previously accessed as a result of the checking in step 317, a response code for the access target URL may be checked.

Here, a response code is a list of HTTP response status codes, and may represent that 1 is conditional response, 2 is success, 3 is redirection completion, 4 is request error, and 5** is server error.

Next, in step 323, in the user terminal, in a case where the access target URL is not normal in communication according to the checking of the response code in step 321, the access target URL may be excluded from the detection target.

Here, in a case where the response code is the redirection code of 3, a final code may be checked by continuously trying requests until the limit of corresponding scope is exceeded. In a case of the response code of 4 or 5**, indicating that the access target URL is not normal in communication, the access target URL may be determined as an inaccessible website and excluded from the detection target.

Meanwhile, in step 325, in the user terminal, in the case where the access target URL is normal in communication according to the checking of the response code in step 321, Hypertext Markup Language (HTML) syntax of the access target URL may be extracted.

For example, in a case where the access target URL has response codes of 1, 2, and some 3**, indicating normal communication, the harmful URL detection process may be performed thereafter. Accordingly, in the user terminal, the HTML syntax for the access target URL that is not excluded from the detection target may be crawled and extracted. Crawling is an operation of collecting content existing on the web, and may extract HTML pages, parse HTML/CSS and the like, and extract only necessary data. This crawling is to extract and process features for artificial intelligence learning, which will be described later.

Next, in step 327, in the user terminal, learning target features for the artificial intelligence learning may be extracted from the extracted HTML syntax.

For example, in the user terminal, a plurality of learning target features are extracted and expressed as numeric data in order to extract meaningful features that enable classification of malicious and normal domains, and then, through correlation coefficient analysis, the features that may affect label classification may be finally extracted.

In such a step, the plurality of learning target features that may induce a difference between the normal and malicious domains (e.g., the number of calls for one's own domain name in HTML of a specific tag compared to the total number of tags, domain part patterns excluding a HTTP protocol and "WWW.", script text patterns in the HTML, keyword extraction, etc.) may be extracted.

Next, in step 329, in the user terminal, the artificial intelligence learning may be performed by creating artificial intelligence learning data including the extracted learning target features.

For example, in the user terminal, a data form for the artificial intelligence learning may be generated by using the plurality of learning target features (e.g., the number of calls for one's own domain name in HTML of a specific tag compared to the total number of tags, domain part patterns excluding a HTTP protocol and "WWW.", script text patterns in the HTML, keyword extraction, etc.) extracted in step 327, and the artificial intelligence learning may be performed by using this data form.

Here, the artificial intelligence learning may be performed with a method of learning a machine learning classifier by using XGBoost, which is used for tree-based ensemble learning. This method has a strong point of enabling excellent classification performance and internal cross-validation, and may be processed with the learning by labeling the created artificial intelligence learning data.

For example, as shown in FIG. 5, a ratio of specific tags with respect to the total number of tags may be expressed as "<a the number of tags 4/the total number of tags 15=0.2667". The number of calls for one's own domain name in HTML is counting the number of domain name occurrences of a corresponding URL in HTML syntax, and may be expressed as the number of occurrences of naver.com in a specific html syntax of the blog.naver.com. The number of occurrences of specific patterns and keywords in script statement in the HTML syntax may be expressed as "C=N;O=D", "slowAES.descrypt", "window.ethereum"+ "window.web3", etc.

In addition, the domain patterns excluding the HTML protocol and "WWW." part may be expressed as "https://www.naver.com→ . . . com", "http://65zipxa.65zipxasaminacrmir→ . . . ir", "http://www.istmall.co.kr→ . . . co.kr", etc.

In addition, in step 331, in the user terminal, whether the access target URL is normal or malicious may be checked (i.e., predicted and classified) by using the artificial intelligence model that has performed the artificial intelligence learning.

In addition, in step 333, in the user terminal, in the case where the access target URL is normal, the access target URL may be added to the whitelist.

Naturally, in the user terminal, in the case where the access target URL is malicious, the corresponding URL may be blocked.

Therefore, according to a third the exemplary embodiment of the present disclosure, in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

In addition, according to the third exemplary embodiment of the present disclosure, in a case where an access target URL is normal in communication according to a response code, HTML syntax of the access target URL is extracted, learning target features for artificial intelligence learning are extracted from the extracted HTML syntax, artificial intelligence learning is performed by creating artificial intelligence learning data including the extracted learning target features, and then, whether the access target URL is normal or malicious is checked by using an artificial intelligence model, whereby a harmful URL may be even more effectively detected and blocked.

Figure 6:
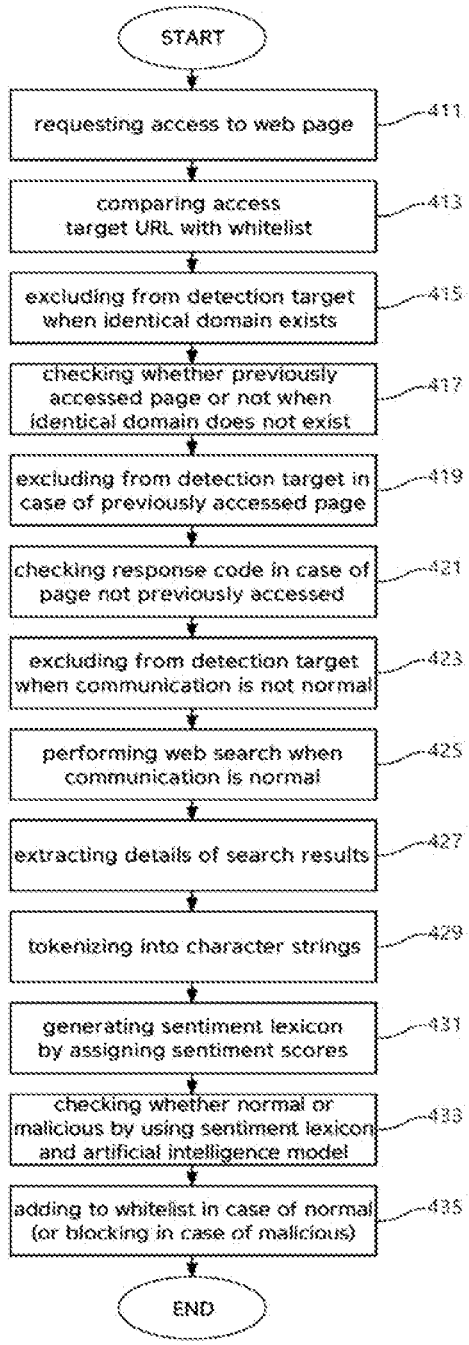
FIG. 6 is a flowchart illustrating a process of detecting a harmful URL according to a fourth exemplary embodiment of the present disclosure.
Figure 8:
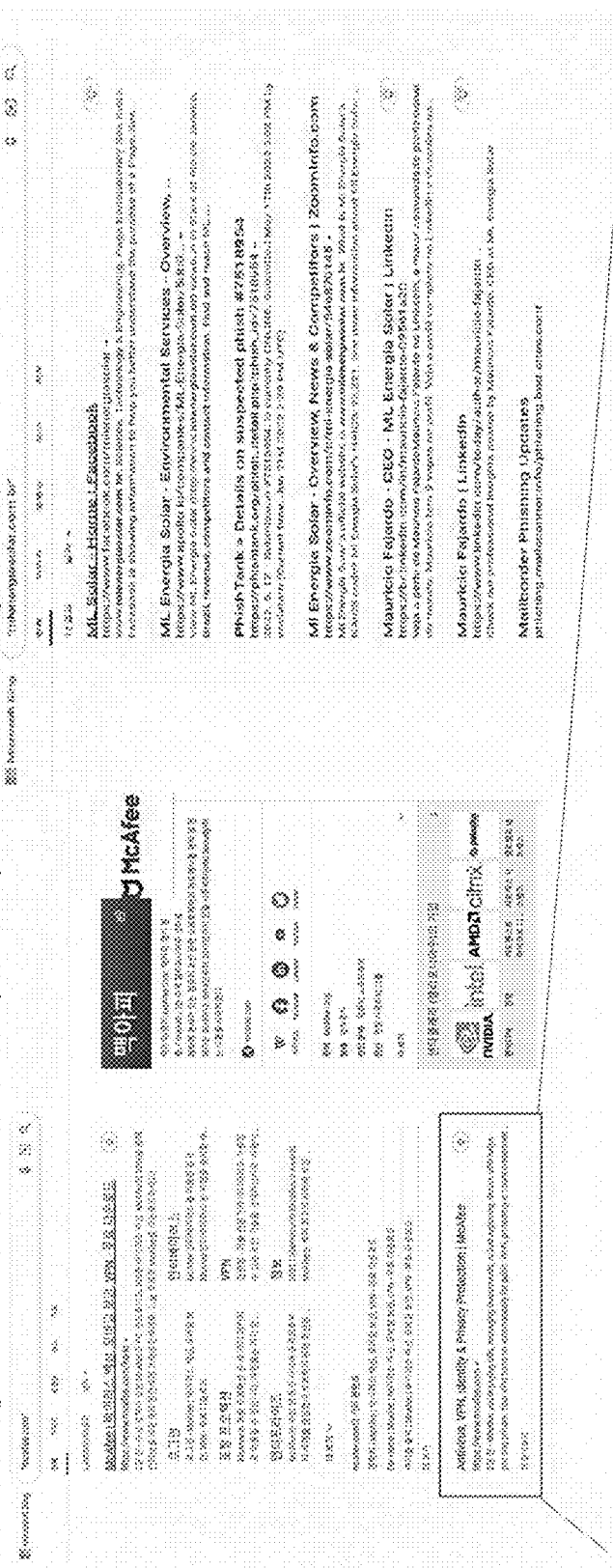

FIG. 6 is a flowchart illustrating a process of detecting a harmful URL according to a fourth exemplary embodiment of the present disclosure, and FIGS. 7 and 8 are views for describing the process of detecting the harmful URL according to the fourth exemplary embodiment of the present disclosure.

Here, the harmful URL detection method may be performed through a processor for executing step-by-step programs for detecting harmful URLs while searching and accessing web pages, a storage medium for storing various setting information, a whitelist, a sentiment lexicon, an artificial intelligence model, and the like, and a user terminal of which the processor is executed (e.g., a computer terminal, a mobile terminal, etc.).

Referring to FIGS. 6 and 8, in step 411, in a user terminal, entry may be requested to a web page to which access is sought. Here, in the user terminal, in a case where the web page is entered after a website is searched, a corresponding entry request may be generated, and accordingly, a harmful URL detection step described below may be performed.

In addition, in step 413, in the user terminal, an access target uniform resource locator (URL) corresponding to the web page requested for the entry may be compared with a pre-stored whitelist.

For example, in the user terminal, a domain area excluding parameters from the entire URL for the access target URL requested for the entry may be extracted, and the extracted domain area may be compared with the pre-stored whitelist in the form of a dictionary.

In step 415, in the user terminal, in a case where an identical domain exists as a result of the comparison in step 413, the access target URL may be excluded from a detection target.

Here, in the user terminal, in a case where a domain same as a domain area of the access target URL exists in the pre-stored whitelist, the access target URL may be determined as a normal URL and be excluded from the detection target (i.e., the harmful URL).

Meanwhile, in step 417, in the user terminal, in a case where the identical domain does not exist as the result of the comparison in step 413, whether the access target URL refers to a previously accessed web page or not may be checked.

In step 140 of checking whether the access target URL refers to the previously accessed web page or not, step 140 may be performed in such a way that in the user terminal, referrers of the access target URL and previously accessed web page are compared with each other to check whether the referrers are the same or not.

For example, in the user terminal, in a case where the domain same as the domain area of the access target URL does not exist in the pre-stored whitelist, whether the web page has been previously accessed or not may be checked in a way of comparing the referrer of the access target URL and the referrer of the previously accessed web page with each other.

Here, a referrer is an HTTP protocol header value, and through this referrer, which webpage the currently displayed webpage was requested from may be checked, and which website or webserver a visitor came from may be determined.

In step 419, in the user terminal, in a case of the previously accessed web page as a result of the checking in step 417, the access target URL may be excluded from the detection target.

Here, in the user terminal, in a case of the previously accessed web page due to the same referrer of the access target URL and that of the previously accessed webpage, the access target URL is determined as a normal URL, and may be excluded from the detection target (i.e., the harmful URL). The reason is that there is no need to perform a process described below because the harmful URL detection target has been checked and classified in the case of the previously accessed web page.

Meanwhile, in step 421, in the user terminal, in a case of a web page not previously accessed as a result of the checking in step 417, a response code for the access target URL may be checked.

Here, a response code is a list of HTTP response status codes, and may represent that 1\*\* is conditional response, 2\*\* is success, 3\*\* is redirection completion, 4\*\* is request error, and 5\*\* is server error.

Next, in step 423, in the user terminal, in a case where the access target URL is not normal in communication according to the checking of the response code in step 421, the access target URL may be excluded from the detection target.

Here, in a case where the response code is the redirection code of 3\*\*, a final code may be checked by continuously trying requests until the limit of corresponding scope is exceeded. In a case of the response code of 4\*\* or 5\*\*, indicating that the access target URL is not normal in communication, the access target URL may be determined as an inaccessible website and excluded from the detection target.

Meanwhile, in step 425, in the user terminal, in a case where the access target URL is not normal in communication according to the checking of the response code in step 421, a web search for the access target URL may be performed.

Here, in a case where the access target URL has response codes of 1\*\*, 2\*\*, and some 3\*\*, indicating normal communication, the harmful URL detection process may be performed thereafter, and accordingly, in the user terminal, a website search for the access target URL may be performed.

In addition, in step 427, in the user terminal, details of the search results for the website search may be extracted. For example, the details from the website search results as shown in FIGS. 7 and 8 may be extracted and converted into text. The details of the search results may be extracted from a website search result screen on the basis of a tag ID, so as to be converted into text.

Next, in step 429, in the user terminal, the extracted details of the search results may be tokenized into character strings.

Here, for natural language processing, first, pre-processing of dividing information on text into units may be performed. Tokenizing means dividing the information (e.g., a sentence or utterance) to be predicted into one specific standard unit. Tokenizing may be performed after removing all but adverbs, adjectives, verbs, and nouns, which are corresponding to positive and negative words.

In addition, in step 431, in the user terminal, a sentiment lexicon may be generated by assigning a sentiment score for each tokenized character string.

Here, in the user terminal, a sentiment score may be assigned for each tokenized character string. As shown in FIG. 8, in a case of Anti+virus, a sentiment score of 1 is assigned to a malicious keyword, which is virus, and a sentiment score of 2 is assigned to a keyword, which is Anti. The sentiment lexicon may be generated by converting the keywords into a dictionary form.

Next, in step 433, in the user terminal, whether the access target URL is normal or malicious may be checked through learning and analysis using the sentiment lexicon and the artificial intelligence model.

In the user terminal, for example, analysis, learning, and prediction may be performed by reflecting the sentiment scores of the sentiment lexicon generated in step 431 to input data of the artificial intelligence model. The learning and analysis method uses a supervised learning method and as shown in FIG. 8, allows determining a difference between a sentiment lexicon reflection result when a normal domain is searched and a sentiment lexicon reflection result when a malicious domain is searched.

Here, as shown in FIG. 8, as an artificial intelligence model, a CNN algorithm capable of extracting, deriving, and predicting features from inside character strings may be used because normal and malicious keywords should be classified and checked according to the presence and positional combination of malicious and normal keywords in a sentence.

In addition, in step 435, in the user terminal, in a case where the access target URL is normal, the access target URL may be added to the whitelist.

Naturally, in the user terminal, in a case where the access target URL is malicious, the corresponding URL may be blocked.

Therefore, according to a fourth the exemplary embodiment of the present disclosure, in a case where entry is requested to a web page to which access is sought from a user terminal, an access target URL corresponding to the web page is compared with a pre-stored whitelist, so that when an identical domain exists, the access target URL is excluded from a detection target, and when the identical domain does not exist, whether the access target URL refers to a previously accessed web page or not is checked; when the web page was previously accessed, the access target URL is excluded from the detection target, and when the web page was not previously accessed, a response code for the access target URL is checked; and when the access target URL is not normal in communication, the access target URL is excluded from the detection, whereby harmful URLs may be effectively detected and blocked.

In addition, according to the fourth exemplary embodiment of the present disclosure, in a case where an access target URL is normal in communication according to a response code, website searches are performed for the access target URL to extract details of search results thereof the extracted details of the search results are tokenized into character strings, a sentiment lexicon is generated by assigning a sentiment score to each tokenized character string, and then by using the sentiment lexicon, whether the access target URL is normal or malicious is checked through learning and analysis using an artificial intelligence model, whereby a harmful URL may be even more effectively detected and blocked.

Figure 9:
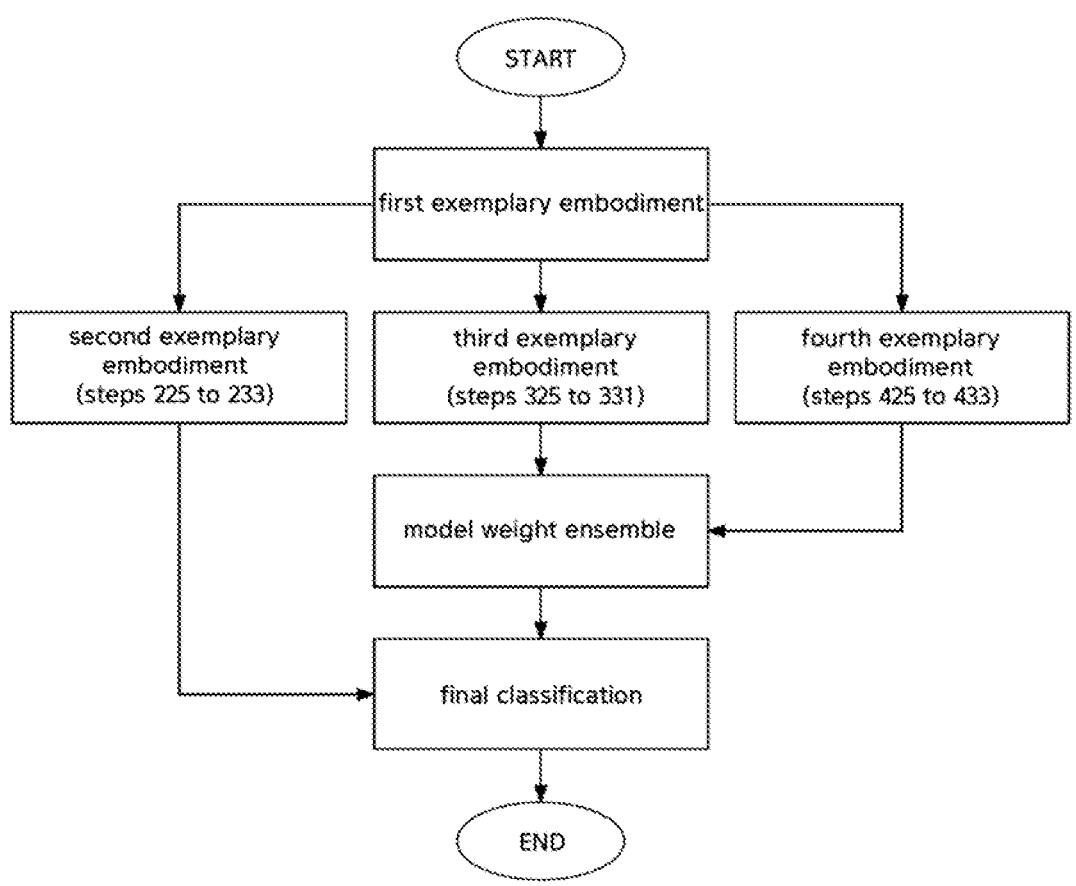
FIG. 9 is a view illustrating a harmful URL detection method according to a fifth exemplary embodiment of the present disclosure.

Meanwhile, FIG. 9 is a view illustrating a harmful URL detection method according to a fifth exemplary embodiment of the present disclosure. The fifth exemplary embodiment of the present disclosure may be performed in such a way that the first exemplary embodiment as described above is configured to be performed at a front stage, and at a next stage, the second exemplary embodiment's rear end process (i.e., steps 225 to 233), the third exemplary embodiment's rear end process (i.e., steps 325 to 331), and the fourth exemplary embodiment's rear end process (i.e., steps 425 to 433) are configured to be performed in parallel. Thereafter, model weight ensemble processing is performed beforehand for the third and fourth exemplary embodiments, and then final classification of consequent results is performed by using the second exemplary embodiment.

That is, the first exemplary embodiment may include steps such as requesting entry to a web page to which access is sought from a user terminal; comparing an access target uniform resource locator (URL) corresponding to the entry-requested web page with a pre-stored whitelist; excluding the access target URL from a detection target in a case where an identical domain exists as a result of the comparison with the whitelist; checking whether the access target URL refers to a previously accessed web page in a case where the identical domain does not exist; excluding the access target URL from the detection target in a case of the previously accessed web page; checking a response code for the access target URL in a case of a web page not previously accessed; and excluding the access target URL from the detection target in a case where the access target URL is not normal in communication according to the checking of the response code.

In addition, the second exemplary embodiment's rear end process (i.e., steps 225 to 233) may include a step such as step 1-1 of performing, in a case where the access target URL is normal in communication according to the checking of the response code, detailed searches on at least one portal for the access target URL, performing clustering by using an artificial intelligence model after extracting features of the number of searches, and classifying the access target URL as normal or malicious by extracting a threshold value between normal and malicious values from which anomalies are removed.

In addition, the third exemplary embodiment's rear end process (i.e., steps 325 to 331) may include a step such as step 1-2 of extracting, in the case where the access target URL is normal in communication according to the checking of the response code, Hypertext Markup Language (HTML) syntax of the access target URL, extracting learning target features for artificial intelligence learning, creating artificial intelligence learning data, performing the artificial intelligence learning, and then checking whether the access target URL is normal or malicious.

Meanwhile, the fourth exemplary embodiment's rear end process (i.e., steps 425 to 433) may include a step such as step 1-3 of performing, in the case where the access target URL is normal in communication according to the checking of the response code, a website search for the access target URL, assigning sentiment scores after extracting and tokenizing details, generating a sentiment lexicon, and checking whether the access target URL is normal or malicious through learning and analysis using the artificial intelligence model.

Thereafter, the fifth exemplary embodiment may perform steps such as step 2 of processing model weight ensemble on each result of step 1-2 and step 1-3; and performing final classification of a result of step 2 by using a result of step 1-1.

Here, the model weight ensemble may be performed in such a way of conducting soft voting, which is a kind of ensemble method, by using probabilities that may be extracted from the results of the third and fourth exemplary embodiments, calculating an average of probabilities belonging to a corresponding category for each classifier, and then classifying the category into a label having the highest mean.

In addition, the second exemplary embodiment is a model expressed in logic to be able to detect a threshold value of a data cluster in which anomalies are removed from normal and malicious values clustered through clustering. Since a narrow range detection may be performed without overdetection and underdetection, the second exemplary embodiment may be applied as a submodel in the final classification in order to detect missing values of the third and fourth exemplary embodiments.

As described above, when all the exemplary embodiments are integrated and applied, the harmful URL may be maximally detected.

Although certain embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art

What is claimed is:

1. A harmful URL detection method, comprising:
   requesting entry to a web page to which access is sought from a user terminal;
   comparing an access target uniform resource locator (URL) corresponding to the entry-requested web page with a pre-stored whitelist;
   excluding the access target URL from a detection target in a case where an identical domain exists as a result of the comparison with the whitelist;
   checking whether the access target URL refers to a previously accessed web page in a case where the identical domain does not exist;
   excluding the access target URL from the detection target in a case of the previously accessed web page;
   checking a response code for the access target URL in a case of a web page not previously accessed;
   excluding the access target URL from the detection target in a case where the access target URL is not normal in communication according to the checking of the response code; and
   in a case where the access target URL is normal in communication according to the checking of the response code, performing at least one of:
   extracting an access target domain from the access target URL and performing detailed searches on at least one portal;
   extracting Hypertext Markup Language (HTML) syntax of the access target URL; or
   performing a website search for the access target URL.

2. The harmful URL detection method of claim 1, wherein, in a case where the access target URL is normal in communication and the access target domain is extracted from the access target URL by performing detailed searches on at least one portal, the method further comprises:
   extracting features of the number of searches from search result pages obtained by performing the detailed searches;
   clustering the extracted features of the number of searches by using an artificial intelligence model;
   extracting a threshold value between normal and malicious values, from which anomalies are removed, from among clustering results obtained through the clustering step; and
   classifying the access target URL as malicious in a case where the extracted threshold value is relatively lower than a preset reference feature value.

3. The harmful URL detection method of claim 2, further comprising:
   adding the access target URL to the whitelist by classifying the access target URL as normal in a case where the extracted threshold value is relatively higher than the preset reference feature value.

4. The harmful URL detection method of claim 1, wherein, in a case where the access target URL is normal in communication and the HTML syntax of the access target URL is extracted, the method further comprises:
   extracting learning target features for artificial intelligence learning from the extracted HTML syntax;
   performing the artificial intelligence learning by creating artificial intelligence learning data comprising the extracted learning target features; and
   checking whether the access target URL is normal or malicious by using the artificial intelligence model that has performed the artificial intelligence learning.

5. The harmful URL detection method of claim 4, further comprising:
   adding the access target URL to the whitelist in the case where the access target URL is normal.

6. The harmful URL detection method of claim 1, wherein, in a case where the access target URL is normal in communication and the website search for the access target URL is performed, the method further comprises:
   extracting details of search results for the website search;
   tokenizing the extracted details of the search results into character strings;
   generating a sentiment lexicon by assigning a sentiment score for each tokenized character string; and
   checking whether the access target URL is normal or malicious through learning and analysis using the artificial intelligence model by using the sentiment lexicon.

7. The harmful URL detection method of claim 6, further comprising:
   adding the access target URL to the whitelist in the case where the access target URL is normal.

8. A harmful URL detection method, comprising:
   requesting entry to a web page to which access is sought from a user terminal;
   comparing an access target uniform resource locator (URL) corresponding to the entry-requested web page with a pre-stored whitelist;
   excluding the access target URL from a detection target in a case where an identical domain exists as a result of the comparison with the whitelist;
   checking whether the access target URL refers to a previously accessed web page in a case where the identical domain does not exist;
   excluding the access target URL from the detection target in a case of the previously accessed web page;
   checking a response code for the access target URL in a case of a web page not previously accessed;
   excluding the access target URL from the detection target in a case where the access target URL is not normal in communication according to the checking of the response code;
   step 1-1 of performing, in a case where the access target URL is normal in communication according to the checking of the response code, detailed searches on at least one portal for the access target URL, performing clustering by using an artificial intelligence model after extracting features of the number of searches, and classifying the access target URL as normal or malicious by extracting a threshold value between normal and malicious values from which anomalies are removed;
   step 1-2 of extracting, in the case where the access target URL is normal in communication according to the checking of the response code, Hypertext Markup Language (HTML) syntax of the access target URL, extracting learning target features for artificial intelligence learning, creating artificial intelligence learning data, performing the artificial intelligence learning, and then checking whether the access target URL is normal or malicious;
   step 1-3 of performing, in the case where the access target URL is normal in communication according to the checking of the response code, a website search for the access target URL, assigning sentiment scores after extracting and tokenizing details, generating a sentiment lexicon, and checking whether the access target URL is normal or malicious through learning and analysis using the artificial intelligence model.

9. The harmful URL detection method of claim 8, further comprising: step 2 of processing model weight ensemble on each result of step 1-2 and step 1-3; and performing final classification of a result of step 2 by using a result of step 1-1.

* * * * *